United States Patent Office 3,840,679
Patented Oct. 8, 1974

3,840,679
CREPING PROCESS OF PREPARING AN IMPROVED MEAT ANALOG
Alexander L. Liepa, Cincinnati, and Thomas J. Slone, Sr., Forest Park, Ohio, assignors to The Procter & Gamble Company, Cincinnati, Ohio
No Drawing. Filed Apr. 28, 1972, Ser. No. 248,581
Int. Cl. A23j 3/00
U.S. Cl. 426—104                    19 Claims

ABSTRACT OF THE DISCLOSURE

A process of making meat analogs which comprises forming a dry protein mix, adjusting the moisture content of the dry mix to form a dough-like protein wet mix, creping the protein wet mix to form a coherent workable creped protein dough sheet, aggregating the creped sheet, preferably coating the aggregate with an edible binder material, and stabilizing the aggregate to form a coherent fiber mass closely resembling meat in appearance, texture, and eating quality. In another embodiment the original mix is a dry fiber mix comprised of starches and/or gums.

BACKGROUND OF THE INVENTION

As is well known by the consumer, the cost of meat and meat-based products is continually rising. These rising costs have forced many people to modify their nutritional intake in an effort to cut down on their intake of expensive meat or meat-based products. The result of course is a diet which does not have sufficient protein present and is therefore nutritionally deficient.

Because of the rising cost of meat and meat-based products, and because of the real nutritional needs of many people which are not being satisfied, in recent years much work has been done in preparing meat analog products. Meat analogs, or in other words synthetic meats, are advantageous when compared with natural meat products, not only from the standpoint of cost, but also from the standpoint of being low calorie and sometimes actually higher in protein content. Therefore, meat analogs can be made superior from the standpoint of nutrition as well as cost.

Currently, most meat analog products are made by two basic processes: that is, either fiber spinning or thermoplastic extrusion. The fiber spinning technique is an adaptation of the spun fiber method of making synthetic fibers utilized in the textile industry. In this method, fibrous protein products are prepared from proteins such as soy protein by forming a spinning dope from alkali-treated protein and extruding the dope through a perforated die or membrane into an aqueous precipitating bath which contains an acid or an acid salt. The acid bath sets the filaments or fibers which are formed in the bath. The filaments may be bundled together and stretched to orient the molecular structure of the fibers. For further details in regard to the fiber spinning technique, see the basic Boyer Pat. 2,682,466, issued June 29, 1954, which relates to spun fiber meat analogs. Other patents relating to such a process include Boyer et al. 2,730,448, issued Jan. 10, 1956, and Boyer, 2,730,447, also issued on Jan. 10, 1956.

The other principal method of forming meat analog products is by thermoplastic extrusion which is an adaptation of technology involved in making ready-to-eat cereal food products. The thermoplastic extrusion process involves preparing a mixture of protein, water, flavor, and other minors, and thereafter feeding the mixture into a cooker-extruder wherein it is subjected to heat and pressure, and subsequently extruding the mixture. The extrudate as it enters into the atmosphere expands to form what has been characterized as "meat-like" fibers. For examples of patents describing the thermoplastic extrusion techniques in forming meat analogs, see U.S. Pats. MacAllister et al., 3,102,031, issued Aug. 27, 1963, Atkinson, 3,488,770, issued Jan. 6, 1970, and British Pats. 1,174,906, published Dec. 17, 1969, and 1,105,904, published Mar. 13, 1968.

While both the fiber spinning technique adapted from the textile industry and the thermoplastic extrusion technique adapted from the ready-to-eat cereal industry have commonly been utilized to provide meat analog materials, it is generally recognized in the industry that the fiber spinning technique is most advantageous from the standpoint of forming actual meat-like fibers. However, the fiber spinning technique is quite expensive as well as complicated, and therefore the use of that technique tends to negate one of the primary purposes for forming meat analog products, i.e. an inexpensive meat substitute. Moreover, it is generally recognized by experts as well as consumers that neither of the above described processes actually produce a product which is meat-like in eating quality.

A third method of forming meat analog products which combines technology from both the spinning method and the extrusion method generally involves formation of a protein dough-like material and thereafter shaping the protein dough, and subsequently either forming layers of protein dough material or, in some cases utilizing a single layer and heating the dough-like material. Of course, the ultimate product prepared by this type of process has differing product characteristics, depending upon how, or whether, layers of material are laminated. For examples of this type of process see in particular two patents issued to Anson et al., U.S. Pats. 2,802,737 issued Aug. 13, 1957, and 2,830,902, issued Apr. 15, 1958.

This process, exemplified by the Anson et al. patent, is notably deficient in producing a product which has meat-like eating quality. In other words, depending upon how the Anson et al. dough sheet is "sandwiched," the product may have the appearance and texture of meat; however, when actually eaten the mouth feel, i.e. eating quality, is different from that of meat. Presumably this is so because of a lack of stringiness when eating the product.

While some of the prior art methods have allowed formation of a product which has an appearance and texture closely resembling that of ordinary meat products, there is no presently known meat analog product which duplicates the eating quality of actual meat as well as the texture and appearance. The term "eating quality" as utilized herein is intended to mean duplication of the mouth feel sensation obtained while eating meat. The eating quality of actual meat is described as "chewy" and "stringy" in nature. Since this chewiness and stringiness is associated with eating actual meats, if meat analogs are to be accepted it is evident that they also must be prepared in such a manner that they have chewiness and stringiness. Duplication of the actual eating quality of meat is difficult because while fibers may be aligned unidirectionally and parallel, it is another matter to provide a sufficient amount of adhesiveness to allow the material to hold together so that it has the texture and appearance of meat and yet not have excessive adhesiveness which, because the fibers are not easily separated, destroys the stringy eating quality.

A copending commonly assigned case of Liepa entitled "An Improved Meat Analog," filed Dec. 21, 1970, Ser. No. 100,549, relates to a unique method of preparing meat analog product. The product is produced in such a manner that closely, if not identically, resembles natural meats in appearance, texture, and eating quality. Like natural meats, the Liepa product, if desired, can have unidirectional parallel fiber structure. The process of that invention involves forming a dry protein mix, adjusting the moisture content of the dry mix to form a dough-like protein wet mix sheeting the wet mix to form a coherent workable protein dough sheet, cutting the sheet to form fiber-like strands, aggregating the strands into a desired alignment, preferably coating the aligned fibers with an edible binder material and, finally, stabilizing the fibers to form a coherent fiber mass. In the coherent fiber mass, individual fibers are aggregated and fused by a process which provides sufficient binding to hold the fibers together but yet allows easy separation of the fibers during eating to thereby duplicate the stringy eating quality of actual meat.

The process of the above-identified Liepa application, which application is incorporated herein by reference, is an excellent one. It allows for the preparation of a meat analog having the appearance, texture, and eating quality of natural meat. And, significantly, this result is achieved without resorting to expensive fiber spinning or thermoplastic extrusion techniques. Moreover, eating quality of natural meat is provided by a process which involves binding individual fibers, preferably with an edible binder, such that there is provided adequate cohesiveness to hold the product in a coherent fiber mass, but not enough cohesiveness to destroy the mouth feel of striated meat-like fibers.

While the Liepa process has significantly improved the economics of meat analog preparation as well as the product quality, a process has now been developed which provides an even further economic savings without any product quality sacrifice. An essential step of the above-described Liepa process involves cutting a dough sheet to form individual fiber-like strands which are thereafter aggregated. A method has now been developed which provides typical fiber structure without the necessity for formation of individual strands. Accordingly the process of this invention represents an improvement from a processing economics point of view over the process of the above described Liepa application.

It is an object of this invention to provide a meat analog product having the appearance, texture, and eating quality of the product prepared by the Liepa process without employing a process step involving the formation of individual fiber strands from a protein sheet. The method of accomplishing this and other objects of this invention will become apparent from the following description of the invention.

SUMMARY OF THE INVENTION

This invention relates to a meat analog product and to a method of making meat analogs. The product resembles natural meat in appearance, texture, and eating quality. Moreover, the product is made without the use of fiber spinning techniques or thermoplastic extrusion techniques. Additionally the process does not employ, as a necessary step, cutting a dough sheet into individual fiber strands, and is therefore especially economical. The process involves forming a dry protein mix, adjusting the moisture content of the dry mix to form a dough-like protein wet mix, creping the protein wet mix to form a coherent workable creped protein dough sheet, aggregating the creped sheet, preferably coating the aggregate with an edible binder material, and stabilizing the aggregate to form a coherent fiber mass. In another embodiment, the original, first mix is a dry fiber mix comprised of starches and/or gums.

DETAILED DESCRIPTION OF THE INVENTION

As used hereinafter, the terms "protein mix" and "dry protein mix," the two being used interchangeably, are meant to include all of the dry ingredients utilized in the initial formation of a protein mix. The dry protein mix, as that term is used herein, does not include any added water.

The term "wet mix" and "moisture-adjusted protein mix," the two being used interchangeably, refer to the moisturized dry protein mix, and the amount of moisture, i.e. water, employed is expressed as percent by weight of the total wet mix, i.e. inclusive of moisture.

In the initial step of the process of this invention, a protein mix is formed. The protein mix, which is subsequently moisture-adjusted to form a wet mix, can comprise from 30% to 100% by weight of edible protein and preferably comprises from 50% to 100% by weight of an edible protein. If amounts of edible protein less than 30% by weight are employed, generally insufficient protein is present to produce meat-like fibers having the eating quality of meat, as explained further hereinafter. On the other hand, if desired, the protein mix can comprise 100% of an edible protein.

While excellent fibers can be formed where the protein mix comprises 100% of an edible protein, it is preferred from the standpont of preparing the most palatable meat analogs that the protein content of the protein mix not be in excess of 80% by weight of an edible protein, and most preferably not in excess of 70% by weight of an edible protein; the remaining portion comprising other ingredients as specified hereinafter.

While not critical to the process of this invention from the standpoint of producing meat-like fibers having the eating quality of meat, but preferable from the standpoint of consumer acceptability, the protein mix can comprise, in addition to an edible protein, certain specific amounts of other ingredients, often referred to as minors, such as preservatives, flavoring, coloring, emulsifiers, stabilizers, binders, vitamins, and the like.

No criticality exists with regard to the source of edible protein. The usual source of such proteins is vegetable protein; however, animal protein may also be employed. Examples of suitable vegetable protein sources are soybeans, safflower seed, corn, peanuts, wheat, peas, sunflower seed, cottonseed, coconut, rapeseed, sesame seed, leaf proteins, single cell proteins such as yeast, and the like. Generally, if the protein source is a vegetable protein, the protein prior to use is placed in a relatively pure form. Thus, for example, if the protein source is soybeans, the soybeans may be dehulled and solvent extracted, preferably with hexane, to remove the oil therefrom. The resulting oil-free soybean meal is then suspended in water, and alkali is added to dissolve the protein and leave behind undissolved carbohydrates. Thereafter the protein is precipitated from the alkaline solution by the addition of an acidic substance. Precipitated protein is then washed and dried to prepare a substantially pure protein isolate. Similar methods can be utilized with regard to other cereal sources of protein.

If desired, animal protein sources can be used. These include animal proteins such as those derived from milk, poultry, meat, and/or fish. A typical example of a suitable animal protein is egg albumin.

It is important to note that the protein portion of the dry protein mix can be either a heat-coagulable or any other edible protein. Of course the protein must be water-hydratable protein in order for effective moisturization to occur as will be explained hereinafter.

While it is not essential that the protein be a heat-coagulable protein, heat-coagulable proteins can be utilized if desired. However, one of the advantages of this process is that it is not necessarily dependent upon the utilization of heat-coagulable protein in forming the dry protein mix. However, where the protein is not a heat-coagulable protein, as will be explained in more detail hereinafter, it is necessary to utilize binding materials, either in the dry mix or in a separate binding step, i.e. coating the fibers with an edible binder material.

Examples of non-heat-coagulable proteins which can be utilized in the process of this invention are casein, pH 7 soluble protein from cottonseed, pH 4.5 soluble protein from soy, and other small molecular weight vegetable proteins.

From the standpoint of low cost, as well as good fiber formation, generally vegetable protein sources such as soy protein and wheat protein are preferred over animal protein sources.

The wet mix, moisture-adjusted dry mix composition, comprises:

| Wet mix: | Percent by weight |
|---|---|
| Dry mix | 90–10 |
| Water | 10–90 |

After forming the protein mix, the moisture content of the protein mix is adjusted to form a wet mix having a moisture content within the range of 10% to 90% by weight of the wet mix. The moisture content of the wet mix should not exceed 90% by weight, because higher moisture contents provide such a low viscosity that during subsequent processing creping will not occur. On the other hand, moisture contents of the wet mix of less than about 10% by weight are undesirable because the material is so viscous as to be extremely difficult to further process.

The precise moisture content within the above specified range to be utilized in any particular process, depends upon the method of creping of the wet mix protein dough as well as the product characteristics desired and the protein source. For example, if creping is to be accomplished by corrugated roll milling, it is preferred that the moisture content be within the range of from 15% to 45% by weight, and preferably within the range of from 20% to 40% by weight. However, if other methods are to be employed, such as utilization of smooth rolls and doctor blades, the moisture content should be for example within the range of from 20% to 35% by weight.

To insure uniform distribution of moisture in the wet mix, after sufficient moisture has been added to provide an adjusted moisture content within the range of from 10% to 90% by weight of the wet mix, the dry mix to which moisture has been added should be mixed to provide a substantially uniform coherent workable protein dough. The exact mixing time utilized is not critical and optimum mixing time is dependent upon the protein source utilized, the composition of the mix, and of course the kind of mixing device employed. The phrase "adjusting the moisture content of the dry mix" as used herein is intended to include adding moisture, i.e. water, within the previously described range and mixing to insure uniform distribution of moisture so as to provide a substantially uniform, coherent workable, dough-like protein wet mix.

No criticality exists in regard to the type of mixing device utilized, and any of those generally available are suitable. For example, the mixer may be a planetary paddle mixer, a sigma mixer, a ribbon blender, a twin paddle mixer, a Hobart mixer, an extruder, and other well known mixers such as Omnimixers.

The next major step of the process of this invention comprises creping the moisture-adjusted protein mix which has the appearance of a coherent workable dough very similar to bread dough. This coherent workable protein dough is ideally suited for creping.

The term "creping" as used herein is utilized to describe a process of making a crinkled sheet of protein dough material. It can be thought of as having the same general qualities of creped paper. The creped sheet of protein dough consists of numerous tiny parallel folds across the width of the sheet. The fold properties, i.e. the height of the folds and the distance between the folds, are functions of the adhesive forces between the portions of the dough sheet and other variables explained hereinafter. The important factor to remember is that by the method of this invention fibrous meat structure is imitated by the ridges and depressions of the creped sheet rather than by the more expensive process of agglomerating individual fiber materials which have been cut from a smooth sheet, thus eliminating the need for a separate fiber cutting step. The creped sheet very closely resembles a single layer of transverse parallel fibers all glued together.

Creping of the moisture-adjusted protein mix to provide a creped sheet having the properties described above can be accomplished by several means. For example, creping can be accomplished by passing the moisture-adjusted protein mix through corrugated roller mills which when mating impart the desired crepe to the protein dough, or creping can be accomplished by utilizing an extruder with specifically designed extruder dies, or by utilizing vibrating or jerking sheeting rolls designed to create alternating high and low density areas on a dough sheet along closely spaced parallel lines, or by utilizing closely spaced electrodes to provide partially or completely coagulated protein in the moisture-adjusted protein mix along parallel lines by means of resistance heating or by utilizing either a stationary or vibrating doctor blade which contacts the moisture-adjusted protein mix as it comes off of a pair of sheeting rolls or a drum dryer.

In the most preferred method of creping, the moisture-adjusted protein wet mix is passed through a plurality of smooth parallel sheeting rolls to provide a smooth coherent workable dough sheet. As the dough sheet passes off of the last roll in the series the sheet is formed into a creped or crinkled form by crowding the protein dough mass against a doctor blade which is angularly disposed with respect to the surface of the last sheeting roll. As a result a creped sheet is formed having a single layer of transverse parallel-like fibers formed by the folds imparted by the doctor blade.

In utilizing the preferred doctor blade means of inducing the formation of a creped sheet an important variable becomes the creping angle. The creping angle is defined as the angle between the surface of the blade and an imaginary plane tangent to the roll mill surface passing through the line of contact between the blade and the roll. When the creping angle is at its maximum theoretical value, 180°, a smooth sheet would of course result. However, as the creping angle decreases, eventually the angle becomes sufficient to induce crowding of the dough mass against the doctor blade at which point creping begins. Continuing as the creping angle decreases further creping intensifies, and the tiny folds in the crepe become more and more compact until finally, a creping angle is reached at which the creped sheet becomes too dense for use in meat analogs. The usable range of creping angle can be defined as generally within the range of from 80° to 140°. If creping angles of greater than 140° are utilized the sheet rather than being creped as desired tends to be smooth and exhibit little or no creping tendency. On the other hand, at creping angles of less than 80° too much dough mass crowding and folding occurs and the creped sheet is too dense to be conveniently utilized in meat analogs. A preferred creping angle is within the range of from 100° to 120° in order to provide optimum creping results to provide the best appearing meat analog having a suitable fiber structure.

As explained above, a preferred embodiment of the invention comprises passing the wet mix through a sheeting means to first form a sheet which is subsequently creped. Suitable means for accomplishing this are 2-roll mills, 3-roll mills, 4-roll mills, an extruder, and the like. It is preferred that where roller milling is employed that differential roll speeds with the faster roll revolving at from 1% to 20% and preferably at least 3% faster than the slowest roll. This is true because it has been found that where differential roll speeds with the faster roll traveling at least 1%, and preferably at 3% greater speed than the slower roll are employed, the sheet will conveniently be fed to the faster moving roll. Preferably, where roll milling is employed the roll speeds are from 2 r.p.m. to 350 r.p.m., and, where heat coagulation of protein during sheeting is not desired, the rolls are maintained at a temperature within the range of 70° F. to 150° F. and preferably from 80° F. to 135° F. However, where some heat coagulation of protein is desired during sheeting and creping the roll temperature should be adjusted to heat the sheet to temperatures between 155° F. and 210° F.

The roll pressure ideally should be within the range of from 10 p.l.i. (pounds per linear inch) to 4000 p.l.i. However, as those skilled in the art know, the exact roll peripheral speed, roll temperature, and roll pressures, depend upon the exact material which is to be passed through the roller mill and therefore can only be specifically determined under the exact conditions employed. However, it can be stated that generally in regard to pressure, the more pressure the tougher the fiber structure of the ultimate meat analog. Preferably, the roll pressure should be within the range of from 1000 p.l.i. to 3000 p.l.i. to form the most desirable fiber structure. Generally, roll conditions should be employed which allow formation of a creped sheet having a thickness of from about .002 to .040 inch and preferably from .005 to .030 inch. Thicknesses within these ranges have been found preferable in making excellent meat-like fibers. At thicknesses above .040 inch the material becomes too thick to give an impression of fibers, and at thicknesses less than .002 inch the fibers are too thin to make good meat-like products.

This creped sheet will have uniform parallel unidirectional fiber alignment ideally suited for simulating the fibers of natural meat products.

Subsequently the creped sheet can be aggregated into any desired configuration, or alternatively the creped sheet itself can be utilized, as is, in the final stabilization step of the process of this invention. The term "aggregated" as used herein is used in its most common manner and means to collect or gather into a mass. For example, the creped sheet can be sized by cutting into portions which can be laminated together to form a different thickness material having a multi-phase fiber effect, or alternatively, the single thickness creped sheet can be utilized.

In the broadest aspect of this invention the next and the last step of the process of this invention involves stabilizing the creped sheet to form a coherent fiber mass closely resembling meat in appearance, texture, and eating quality. Stabilization is generally accomplished by heating the aligned fibers of the creped product at a temperature within the range of from 155° F. to 400° F. At temperatures within this range the mixture is heat set to insure stabilization within the desired configuration. Preferred stabilization temperatures are within the range of from 170° F. to 300° F. Temperatures above 400° F. should be avoided in order to prevent adverse effects.

The time of heat stabilization necessarily depends upon the size or volume of the mass that is heated. While suitable stabilization can occur without the application of pressure, it is preferred that some pressure be utilized. Where pressure is employed, it can be exerted by the utilization of an autoclave for stabilization, or alternatively the material can be confined within a particular zone such that the tendency toward expansion during stabilization provides the necessary pressure. For example, see commonly assigned application of Alexander L. Liepa entitled "Meat Analog Apparatus," Ser. No. 101,-930, filed Dec. 28, 1970, now U.S. Pat. No. 3,693,533. In this machine, which comprises two substantially synchronized heated steel belted conveyors having side confining walls, the creped sheet is conveyed from the wide end of a converging conveyor gap to the narrow end of a converging conveyor gap while simultaneously being heat stabilized.

In a preferred embodiment of this invention an additional step during or subsequent to creping and prior to the stabilizing step comprises heat treating the creped sheet in a separate process step. When this is done the fibers of the creped sheet are tougher and stronger, after further treatment in accord with the process of this invention, and have a texture of distinctly defined chewy fibers. During this heat treating step the entire creped mass can be heated or only the ridges of the folds or only the valleys of the folds. This heat treating fibers step can conveniently be used when duplicating especially "stringy" or coarse meats such as chuck roast. Where this separate fiber heat treating step is employed, temperatures within the range of 155° F. to 300° F. should be employed along with heat treating times of from a few seconds up to 60 minutes.

If, desired, stabilization can occur without heating providing that suitable edible binder materials are utilized. In other words, the gelling properties of certain materials such as some gums and gelatin, as well as starches, may be employed for stabilization, in which case the product need not be heat stabilized. Examples of suitable edible binder materials which can be utilized without the necessity for employing heat stabilization are guar gum, locust bean gum, Carrageenan gum, pectin, gum arabic, gum acacia, agar, cellulose derivatives such as carboxymethyl cellulose, cornstarch, potato starch, wheat starch, tapioca, and the like.

Where edible binders are employed and stabilization is conducted without heating, compression at pressures of from .5 p.s.i. to 100 p.s.i. are often employed; however, with some binders, the gelling property is sufficient that stabilization will occur merely upon standing for a period of time. If desired, compression within the above range can be employed with heat stabilized products to further expand the resulting fibers of the meat analog and to further enhance the meat-like texture and eating quality. Preferably this is accomplished while the analog is hot, i.e. higher than room temperature.

As previously mentioned, although not essential in the broadest aspect of this invention but highly preferred, an additional step which occurs after creping and before stabilization, comprises coating the aligned fibers of the creped sheet with an edible binder material. Suitable binder materials have previously been mentioned; however, it should be noted that with some edible binders because of their inherent cohesive character, a thin coating of water alone will act as a suitable binder material. Therefore the use of water as an edible binder for this preferred step also is contemplated by this invention.

Again as previously mentioned, the additional step of coating the creped sheet with an edible binder is preferred but not essential in the broadest aspect of this invention; however, where the protein portion of the dry protein mix is not a heat coagulable protein, it is essential that the creped sheet be coated with an edible binder prior to stabilization or that binder be included in the protein mix.

Turning now to a more complete description of the coating step, after the creped sheet, or portions of the sheet have been aggregated, i.e. aligned into a desired configuration, the creped sheet can be coated with a suitable edible binder material. Suitable edible binders besides those previously mentioned can be, for example, egg albumen, cereals, dextrose, heat-coagulable proteins, and alginates. Of course, the edible binder must be a partially water-soluble edible binding material.

The edible binder is prepared by adding moisture to the edible binder material to form a water-edible binder mixture which is generally from 10% to 90% by weight of water, and preferably from 20% to 80% by weight of water. The water-edible binder mixture can be coated upon the creped sheet in a number of ways. For example, the water-edible binder mixture can be sprayed upon the creped sheet, extruded and placed upon the creped sheet as a thin film, or placed upon the fibers of the creped sheet by any other conventional coating means such as, for example, dipping the creped sheet into the water-edible binder mixture.

The amount of edible binder material placed upon any aligned fiber mass, i.e. portion of the creped sheet, is dependent upon a number of circumstances such as the end product texture desired, the protein material utilized in forming the aggregated fibers, and the particular edible binder employed. However, it has generally been found that to produce a product which has sufficient binder present to impart the necessary cohesiveness to the product such that the product remains together during handling and packaging and yet is not bound so tightly that the mouth eating quality of stringy meat is lost, the ratio of fiber material, i.e. creped sheet to binder material should be within the range of from 95:5 to 5:95 and preferably from 75:25 to 20:80.

While not essential to the process of this invention, but preferable from the standpoint of simulating some meat products, vegetable and animal fats or combinations of such fats are normally added to the creped sheet previous to or simultaneously with coating with edible binders in order to raise the fat content of the protein fiber. The fat content is usually adjusted to simulate a pre-selected meat product. The type of fat is often selected for reasons of market objectives and the like. For instance, a vegetable fat such as cottonseed oil has been used when an unsaturated fat is desired for simulated meat containing no animal products. Where there is no objection to the use of an animal fat, such fats may be incorporated into the fiber of the creped sheet to achieve the desired fat level. Other ingredients such as flavoring agents, coloring, seasoning, and the like can also be added to the fat composition to simulate any particular meat product.

Suitable fats for utilization in the fat composition are well known and generally comprise liquid or semi-liquid glyceride shortenings derived from animal, vegetable, or marine fats and oils, including synthetically prepared shortenings. These glycerides can contain saturated or unsaturated "long chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonyl, behenoyl, erucoyl, and the like, and are generally obtained from edible fats and oils such as cottonseed oil, soybean oil, coconut oil, rapeseed oil, peanut oil, olive oil, palm oil, palm kernel oil, sunflower seed oil, rice bran oil, corn oil, sesame seed oil, safflower oil, wallflower oil, nasturtium seed oil, whale oil, sardine oil, herring oil, menhaden oil, pilchard oil, lard, tallow and the like. These glycerides can also contain, in part, one or two short chain acyl groups having from 2 to about 6 carbon atoms such as acetyl, propanoyl, butanoyl, valeryl, and caproyl; they can be prepared by random or low-temperature interesterification reactions of fatty triglyceride-containing oils and fats, such as interesterified or rearranged cottonseed oil and lard; and they can be otherwise formed by various organic syntheses. Where a fat composition is employed, it is generally preferred that the fat composition be utilized at a ratio of from 1:0.1 to 1:4 of fibrous material, i.e. creped sheet, to fat material.

If desired, the edible binder, where one is employed, and the fat composition can be mixed together along with flavoring, dyes, and other minors and simultaneously placed upon the aligned fibers.

After stabilization in the manner previously described is completed, the product may be cut or otherwise formed into suitable shapes, dried, coated with any additional substance, fried, frozen, sterilized, heated, or otherwise treated and thereafter packaged for use.

It is to be understood that if desired the process of this invention can be combined with the process of the previously incorporated by reference Liepa application. In other words, and according to the process of the previous Liepa application, the sheet that is formed can be a crepe sheet which is subsequently cut into individual fibers and thereafter treated (see Example 2). Where this combined process of creping, fiber cutting, and fiber aligning and thereafter stabilization occurs, a slight overall improvement in mouth eating qualities has been noted.

In yet another embodiment of this invention the first prepared mix, i.e. dry protein mix, can be prepared without the use of any protein, in which case protein is added to the binder mix. In this embodiment the first prepared mix is referred to as a dry binder mix and can be prepared from starches, gums, and combinations thereof. Suitable starches for use in this embodiment are:

Corn
Wheat
Potato
Sago
Waxy maize
Tapioca
Arrowroot
Rice
Potato amylopectin
Cross-linked starches
Starch derivatives:
    Carboxymethyl starch
    Hydroxyethyl starch
    Hydroxypropyl starch
Oat
Barley
Cassava Suitable gums for use in this embodiment are:

Arabic
Tragacanth
Karaya
Larch
Ghatti
Locust Bean
Guar
Psyllium seed
Quince seed
Agar
Algin
Carrageenan
Furcellaran
Pectin
Carboxymethyl cellulose
Methyl cellulose
Hydroxypropylmethyl cellulose
Hydroxypropyl cellulose
Hydroxyethyl cellulose
Ethylhydroxyethyl cellulose
Dextran
Polysaccharide B-1459 (Kelzan)
Low methoxyl pectin
Propylene glycol alginate
Triethanol amine alginate
Carboxymethyl locust bean gum
Carboxymethyl guar gum Where this embodiment is employed the binder should comprise on a dry weight basis from 10% to 90%, and preferably from 40% to 80% by weight of the previously described proteins. Example 4 shows this embodiment of the invention.

The following Examples are offered to further illustrate but not limit the process of the invention.

EXAMPLE 1

The following mixture was prepared by mixing the ingredients for 5 minutes at 60 r.p.m. in a Hobart A-200 mixer equipped with a dough hook:

| Ingredient: | Amount (percent by weight) |
|---|---|
| Egg white solids [1] | 29.9 |
| Soy protein isolate | 29.9 |
| Vital wheat gluten [1] | 3.0 |
| Pregelatinized starch | 4.0 |
| Liquid shortening | 1.25 |
| Beef flavors | 4.45 |
| Coloring | 0.5 |
| Water | 27.0 |
| Total | 100.00 |

[1] Heat coagulable protein.

The dry mix comprised all of the ingredients except the water. The wet mix comprised 27% by weight moisture and 73% dry mix. The mixture was next passed through a noodle extruder to provide intense mixing of the ingredients. The strands emerging from the die were homogeneous and had a circular cross section of approximately 5/16 inch diameter. The strands were cut into approximately 1/8 inch long pellets by means of a rotating knife cutting at the surface of the die.

The pellets were fed into a 3-roll mill through a hopper positioned between rolls No. 1 and No. 2. The roll speed was adjusted so that roll No. 2 rotated about 4% faster (approximately 3 r.p.m.) than roll No. 1, and roll No. 3 rotated about 4% faster than roll No. 2. Roll temperatures were 90° F. for roll No. 1, 95° F. for roll No. 2 and 105° F. for roll No. 3. Sheeting of the protein pellets to form a coherent workable protein dough sheet resulted; the sheet was transferred in sequence to roll No. 2 and roll No. 3. The distances between the rolls were adjusted to produce a sheet of .006 inch thickness. The sheet was removed from roll No. 3 by means of a doctor blade which is angularly disposed with respect to roll No. 3. The angle between the surface of the blade and an imaginary plane, tangent to roll No. 3 and passing through the blade edge-roll contact line, was 128°. A brown creped sheet resulted consisting of numerous tiny, parallel folds approximately 0.033 inch high and 0.04 inch apart, which resembled a single layer of parallel fibers fused together. The creped sheet was pulled away from the blade by means of a conveyor.

The following mixture was prepared for use as an edible binder:

| Ingredient: | Amount (percent by weight) |
|---|---|
| Egg white solids [1] | 7.10 |
| Liquid shortening | 11.10 |
| Salt | 0.67 |
| Coloring | 0.22 |
| Beef flavors | 3.11 |
| Water | 77.80 |
| Total | 100.00 |

[1] Heat coagulable protein.

All of the edible ingredients were mixed in a commercial type Waring Blendor for 10 minutes at high speed. The mixture was homogeneous, brown in color, and had a consistency approximately equal to meat gravy or cake batter.

The creped protein sheet was covered on both sides with a layer of binder approximately 0.025 inch thick. The binder-covered sheet was then folded upon itself, the creases in the crepe running parallel to the folds, to form an aggregate slab of a width equal to the width of the creped protein sheet and approximately 3/4 inch thick. The creped sheet-binder ratio in the slab was approximately 40:60 by weight. The slab was next passed through a continuous cooker-conveyor consisting of two moving, heated, converging stainless steel belts. The temperatures of the belts were 230° F. for the top belt and 240° F. for the bottom belt. The cooker-conveyor was adjusted to compress the slab to a thickness of about 1/2 inch; residence time in the cooker-conveyor was 45 minutes. The product emerging from the cooker-conveyor had the appearance of a 1/2 inch thick slab of cooked beef. Examination of the product showed a fibrous, meat-like texture; eating quality was fibrous and similar to that of cooked beef muscle.

Substantially similar results are obtained where the creped protein sheet is coated with the binder only on one side prior to being aggregated into a slab.

EXAMPLE 2

A creped protein sheet was prepared as described in Example 1, except that the three sheeting rolls were at approximately 75° F. and the angle of the creping knife, i.e. doctor blade, was 113°. The creped sheet had the following composition:

| Ingredient: | Amount (percent by weight) |
|---|---|
| Soy protein isolate [1] | 41.0 |
| Egg white solids [1] | 27.0 |
| Liquid shortening | 1.0 |
| Coloring | 0.5 |
| Beef flavor | 2.0 |
| Water | 28.5 |
| Total | 100.0 |

[1] Heat coagulable protein.

The creped protein sheet was conveyed to a rotary cutter equipped with six blades and operated at about 75 r.p.m. Cuts were made across the width of the creped sheet and parallel to the tiny folds in the crepe, producing strands 1/16 to 1/8 inch wide and about 12 inches long.

The strands were aggregated in parallel alignment and coated with a binder prepared as in Example 1 and having the following composition:

| Ingredient: | Amount (percent by weight) |
|---|---|
| Egg white solids [1] | 8.00 |
| Liquid shortening | 25.25 |
| Salt | 1.00 |
| Coloring | 0.50 |
| Beef flavor | 1.50 |
| Guar gum | 1.25 |
| Water | 62.50 |
| Total | 100.0 |

[1] Heat coagulable protein.

The coating operation was performed in the following continuous sequence:

(a) a thin layer of binder was placed on a moving con-conveyor belt;
(b) a layer of substantially parallel protein strands was deposited by the rotary cutter on the layer of binder;
(c) a thin layer of binder was deposited on top of the strands.

The resulting layer consisting of protein strands imbedded in binder was transferred by the conveyor to the bottom belt of the cooker-conveyor, described in Example 1, which moved at a substantially slower speed than the belt carrying the coated strands. As a result, a 3/4 inch thick slab was produced which was then compressed and cooked as in Example 1. The product emerging from the cooker-conveyor was a continuous 1/2 inch thick slab closely resembling cooked beef in appearance, fibrous texture, mouthfeel, and eating quality. The fiber/binder ratio in the meat analog was approximately 35:65.

EXAMPLE 3

The following mixture was prepared by mixing ingredients for 5 minutes at 60 r.p.m. in a Hobart A–200 mixer equipped with a dough hook:

| Ingredient: | Amount (percent by weight) |
|---|---|
| Soy protein isolate [1] | 39.5 |
| Egg white solids [1] | 27.20 |
| Liquid shortening | 1.00 |
| Coloring | 0.30 |
| Beef flavors | 3.00 |
| Water | 29.00 |
| Total | 100.0 |

[1] Heat coagulable protein.

The dry mix comprised all the ingredients except the water. The wet mix comprised 29% by weight moisture and 71% by weight dry mix.

The wet mix was passed through a noodle extruder to provide intense mixing of the ingredients. The strands emerging from the extruder die were homogeneous and had a circular cross section of approximately 5/16" in diameter. The strands were cut into approximately 1/8" long pellets by means of a rotating knife cutting at the surface of the extruder die.

The wet mix pellets were fed into a 3-roll mill through a hopper as described in Example 1. Roll milling and creping conditions were the same as those provided in Example 1 except for the following changes: rolls No. 1 and 2 were maintained at room temperature. The third roll was maintained at 110° F. Distances between the rolls were adjusted to produce a sheet of 0.004" thickness. The third roll was equipped with a doctor blade as described in Example 1. A sheet dough mass piled against the doctor blade such that folding occurred to produce a brown creped sheet consisting of numerous tiny folds across the width of the sheet. There were in fact approximately 28 folds per inch. The creped sheet was pulled away from the doctor blade or knife, the two terms being used interchangeably herein, by means of a conveyor.

Thereafter the creped sheet was cut into strands by means of a rotary cutter equipped with six blades and operating at 110 r.p.m. Cuts were made across the width of the creped sheet and parallel to the tiny folds in the crepe producing strands of 1/16" and 1/8" wide and approximately 12 inches long. The strands were aggregated in parallel alignment and coated with binder having the composition described below.

The following mixture was prepared for use as an edible binder:

| Ingredient: | Amount (percent by weight) |
|---|---|
| Liquid shortening | 24.000 |
| Coloring | 0.300 |
| Salt | 1.000 |
| Guar gum | 1.125 |
| Egg white | 8.000 |
| Beef coloring | 3.000 |
| Water | 62.575 |

The creped aligned fibers were covered with the above-described binder on both sides with a layer approximately .016 inch thick. The creped sheet-binder ratio in the slab was approximately 35 to 65 by weight. The binder-coated creped aligned strands were passed through a continuous cooker-conveyor as described in Example 1. The converging gap in the conveyor was adjusted to provide a more confining space in the machine flow direction and to thus increase the compression occurring during passage through the continuous cooker-conveyor. In particular, the cooker-conveyor was adjusted to compress the slab to a thickness of about 1/2 inch; residence time in the cooker-conveyor was 45 minutes. The product emerging from the cooker-conveyor had the appearance of a 1/2 inch thick slab of cooked beef. Examination of the product showed that increased pressure within the cooker-conveyor caused the binder coating material to flow transversely to the machine flow direction and provide very fine fiber-like appearance over the thicker fiber materials of the creped cut strands. In other words, the entire slab consisted of fibers made from the creped sheet which was cut into creped strands covered with fibers formed by the binder due to the stretching induced by the increased compression during cooking. Additionally, the creped, cut strands were stretched to three times their original length during compression to possibly provide a common molecular orientation within the strands. The combined effect was an extremely meat-like product.

EXAMPLE 4

The following mixture is prepared by using equipment and technique as described in Example 3:

| Ingredient: | Amount (percent by weight) |
|---|---|
| Pregelatinized wheat starch | 66.0 |
| Methyl cellulose | 1.0 |
| Liquid shortening | 2.0 |
| Beef flavor | 1.9 |
| Coloring | 0.1 |
| Water | 29.0 |
| Total | 100.0 |

The mixture is extruded, pelletized, sheeted, creped and shredded as in Example 3.

The following mixture is prepared for use as an edible binder by mixing the ingredients for 10 minutes at high speed in a Waring Blendor:

| Ingredient: | Amount (percent by weight) |
|---|---|
| Egg white solids [1] | 32.0 |
| Soy protein isolate [1] | 8.0 |
| Liquid shortening | 12.0 |
| Beef flavor | 3.8 |
| Coloring | 0.2 |
| Water | 44.0 |
| Total | 100.0 |

[1] Heat coagulable protein.

The creped aligned fibers are covered with the above-described binder on both sides with a layer approximately 0.016 inch thick. The creped sheet-binder ratio in the slab is approximately 45 to 55 by weight. The slab is then passed through a continuous cooker-conveyor operated at the same conditions as in Example 3. The product emerging from the cooker has the fibrous texture, appearance and eating quality of cooked beef muscle.

EXAMPLE 5

The following mixture was prepared by using equipment and technique as described in Example 3:

| Ingredient: | Amount (percent by weight) |
|---|---|
| Soy protein isolate [1] | 39.62 |
| Egg white solids | 27.20 |
| Liquid shortening | 1.00 |
| Coloring | 0.18 |
| Beef flavors | 3.00 |
| Water | 29.00 |
| Total | 100.0 |

[1] Heat coagulable protein.

The mixture was extruded, pelletized, sheeted, creped and shredded as in Example 3, except that mill roll temperatures were as follows: roll No. 1—75° F.; roll No. 2—80° F.; roll No. 3—110° F.

The following mixture was prepared for use as an edible binder using equipment and technique as in Example 3:

| Ingredient: | Amount (percent by weight) |
|---|---|
| Egg white solids [1] | 8.00 |
| Egg yolk solids [1] | 2.50 |
| Liquid shortening | 22.00 |
| Coloring | 0.27 |
| Beef flavor | 3.00 |
| Salt | 1.00 |
| Guar gum | 1.10 |
| Water | 62.13 |
| Total | 100.00 |

[1] Heat coagulable protein.

The shredded strands were coated with binder and aggregated into a one-inch thick slab using the equipment and techniques of Example 3.

The wet aggregate was then placed in a microwave oven and heated for approximately 6 minutes at a power consumption of 3 kw. This resulted in coagulation of the protein. The cooked mass was immediately thereafter placed in a special die, preheated to 180° F., and compressed in a hydraulic press permitting the material to flow in a direction parallel to the imbedded strands. The compressed material was then removed from the press. Examination of the material showed that during the compression the imbedded protein strands had been stretched to approximately three times their original length, while the binder had formed thin, fiber-like filaments of its own. The resultant product was extremely meat-like, having the appearance, texture, and eating quality of cooked beef muscle.

What is claimed is:

1. A process for preparing a meat analog which comprises the steps of forming a dry protein mix which comprises from 30% to 100% by weight of edible protein; adjusting the moisture content of the dry mix to form a dough-like protein wet mix; creping the protein wet mix to form a coherent workable creped protein dough sheet; aggregating the creped sheet by collecting the sheet into a mass; and stabilizing the aggregate by heating at a temperature of from 155° F. to 300° F. to form a coherent fiber mass resembling meat in appearance, texture, and eating quality.

2. The process of Claim 1 wherein the protein is a heat-coagulable protein.

3. The process of Claim 1 wherein the aggregate is compressed during or after heat stabilization while still hot, thereby to stretch the creped fibers.

4. The process of Claim 1 wherein an additional step prior to stabilization comprises adding fat to the creped sheet.

5. The process of Claim 1 wherein said creping is accomplished by crowding the protein wet mix against a doctor blade which is in contact with the surface of a sheeting roll.

6. A process for preparing a meat analog which comprises forming a dry protein mix which comprises from 30% to 100% by weight of edible protein; adjusting the moisture content of the dry mix to form a dough-like protein wet mix; creping the protein wet mix to form a coherent workable creped protein dough sheet; coating the creped sheet with an edible binder material; aggregating the coated sheet by collecting the sheet into a mass; and stabilizing the aggregate by heating at a temperature of from 155° F. to 300° F., to form a coherent fiber mass resembling meat in appearance, texture, and eating quality.

7. The process of Claim 6 wherein protein is a heat-coagulable protein.

8. The process of Claim 7 wherein the wet mix comprises from 10% to 90% dry mix and the remaining portion water.

9. The process of Claim 6 wherein creping is accomplished by crowding the protein wet mix against a doctor blade which is in contact with the surface of a sheeting roll.

10. The process of Claim 6 wherein an additional step prior to stabilization comprises adding fat to the creped sheet.

11. A process for preparing a meat analog comprising the steps of forming a dry protein mix which comprises from 30% to 100% by weight of edible protein; adjusting the moisture content of the dry mix to form a dough-like protein wet mix; forming a coherent workable protein dough sheet; creping the sheet thereby to provide a crinkled appearance; cutting the creped sheet into a plurality of fiber strands; aggregating the fiber strands into a collected mass of desired fiber alignment; and stabilizing the collected mass by heating at a temperature of from 155° F. to 300° F., thereby to provide a coherent fibrous mass resembling meat in appearance, texture, and eating quality.

12. The process of Claim 11 wherein the protein is a heat-coagulable protein.

13. The process of Claim 11 wherein the fiber strands are coated with an edible binder prior to aggregating and stabilizing.

14. The process of Claim 11 wherein said creping is accomplished by crowding the wet mix against a doctor blade which is in contact with the surface of a sheeting roll.

15. A process for preparing a meat analog which comprises the steps of forming a dry mix comprising a starch or gum and containing no protein; adjusting the moisture content of the dry mix to form a dough-like wet mix; creping the wet mix to form a coherent workable creped sheet; aggregating the creped sheet by collecting the sheet into a mass; coating the aggregate with an edible binder material, said binder material containing from 10% to 90% by weight of protein; and stabilizing the aggregate by heating at a temperature of from 155° F. to 300° F. to form a coherent fiber mass closely resembling meat in appearance, texture, and eating quality.

16. The process of Claim 15 wherein the binder comprises from 40% to 80% protein.

17. A process for preparing a creped protein sheet comprising the steps of forming a dry protein mix which comprises from 30% to 100% by weight of edible protein; adjusting the moisture content of the dry mix to form a dough-like protein wet mix; creping the protein wet mix to form a coherent workable creped protein dough sheet; and stabilizing the creped sheet by heating at a temperature of from 155° F. to 300° F. to form a coherent fiber mass.

18. The process of Claim 17 wherein the protein is a heat-coagulable protein and the creping is accomplished by crowding the protein wet mix against a doctor blade which is in contact with the surface of a sheeting roll.

19. The product prepared by the process of Claim 17.

References Cited

UNITED STATES PATENTS

| | | | |
|---|---|---|---|
| 2,682,466 | 6/1954 | Boyer | 426—104 |
| 2,802,737 | 8/1957 | Anson et al. | 99—14 |
| 2,830,902 | 8/1958 | Anson et al. | 99—14 |
| 3,142,571 | 7/1964 | McAnelly | 99—14 |

JAMES R. HOFFMAN, Primary Examiner

U.S. Cl. X.R.

426—302, 362, 364, 506, 802